United States Patent [19]

Matthes

[11] Patent Number: 4,875,150
[45] Date of Patent: Oct. 17, 1989

[54] PARALLEL OSCILLATORY CIRCUIT FREQUENCY CONVERTER WITH SAFETY CIRCUIT

[75] Inventor: Hans G. Matthes, Wermelskirchen, Fed. Rep. of Germany

[73] Assignee: AEG-Elotherm GmbH, Remscheid-Hasten, Fed. Rep. of Germany

[21] Appl. No.: 227,895

[22] Filed: Aug. 3, 1988

[30] Foreign Application Priority Data

Sep. 5, 1987 [DE] Fed. Rep. of Germany ....... 3729786

[51] Int. Cl.[4] ........................ H02M 7/515; H02H 7/00
[52] U.S. Cl. ........................................ 363/51; 363/58; 363/136
[58] Field of Search ................. 363/37, 51, 56, 57, 363/58, 135, 136, 137, 138

[56] References Cited

U.S. PATENT DOCUMENTS

| | | | |
|---|---|---|---|
| 3,611,108 | 10/1971 | Susumu et al. | 363/58 |
| 3,852,656 | 12/1974 | Bourbeau | 363/58 |
| 4,041,365 | 8/1977 | Peak et al. | 363/58 |
| 4,506,196 | 3/1985 | Bees | 363/58 |

FOREIGN PATENT DOCUMENTS

| | | |
|---|---|---|
| 0109522 | 10/1983 | European Pat. Off. . |
| 2722814 | 11/1978 | Fed. Rep. of Germany . |
| 3237716 | 9/1984 | Fed. Rep. of Germany . |
| 3425324 | 1/1986 | Fed. Rep. of Germany . |

*Primary Examiner*—Peter S. Wong
*Attorney, Agent, or Firm*—Michael J. Striker

[57] ABSTRACT

The invention relates to a parallel oscillatory circuit frequency converter comprising: a rectifier (1); an inverse rectifier (4) having thyristors disposed in a bridge circuit; a parallel oscillatory circuit (5) having an inductance (L) and a series connection of two capacitors (C, $C_K$) whereby one capacitor (C) is connected to the load points of the bridge circuit; and a gate-controlled turn-off time control device (6) for the alternate firing (switching) of the thyristors a, b forming the particular diagonally adjacent bridge branches with a cycle frequency adapted to maintain a minimum turn-off time, a safety firing circuit (24, 25) controlled by a detector circuit (11-23) to detect incorrect switching delivering firing pulses without delay to all the thyristors at least until all the thyristors are current-carrying.

4 Claims, 1 Drawing Sheet

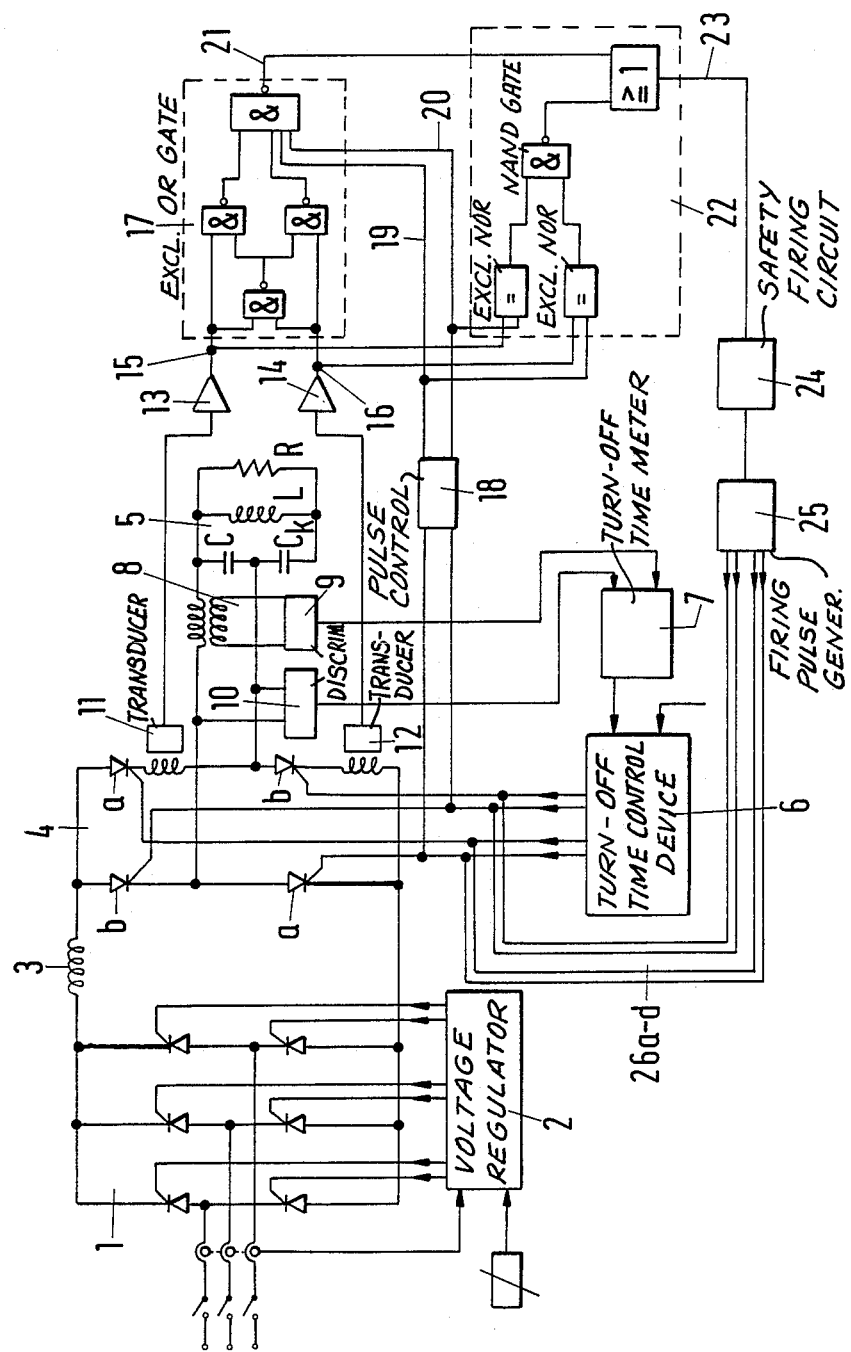

PARALLEL OSCILLATORY CIRCUIT FREQUENCY CONVERTER WITH SAFETY CIRCUIT

The invention relates to a parallel oscillatory circuit frequency converter comprising: a rectifier; an inverse rectifier having thyristors disposed in a bridge circuit; a parallel oscillatory circuit including an inductance and a series connection of two capacitors, the terminals of one of the capacitors being connected to the load points of the bridge circuit, and a gate-controlled turn-off time control device for the alternate firing (switching) of the thyristors forming the diagonally adjacent bridge branches with a cycle frequency adapted to maintain a minimum turn-off time.

A frequency converter of the kind specified, disclosed in German OS 34 25 324, is preferably used in the inductive heating of workpieces, the elements of the load circuit consisting of that ohmic/inductive proportion of induction coil and workpiece which changes in the course of the heating operation, and also of the capacitive proportion of a generally fixed-value series connection of two capacitors. A gate-controlled turn-off time control device is also provided which operates the thyristors in the inverse rectifier bridge with a cycle frequency higher than the specific frequency of the parallel oscillatory circuit, so that the bridge current can be switched by the thyristors in the diagonally adjacent bridge branches of the inverse rectifier. The cycle frequency is so selected as to be as little as possible greater than the specific frequency of the load circuit, so that the turn-off time of the thyristors differs only slightly from the required minimum turn-off time. As a result the inverse rectifier gives off the maximum power to the load circuit.

To determine the actual value of the turn-off time, this prior art arrangement uses a measuring device (already disclosed in German OS 32 37 716) which determines the signal for the turn-off time of the thyristors of two bridge branches from the current and/or voltage on the load circuit via an integration operation. To obtain the given minimum turn-off time as a required value, the actual turn-off time is determined in one of the diagonals either separately from half period to half period, or averaged over a number of half periods, and adjusted accordingly via the turn-off time control device.

However, it is a disadvantage of this prior art circuit that sudden changes in the impedance of the laod circuit, such as may occur, for example, due to bridge formations in inductively heated workpieces, the specific frequency of the parallel oscillatory circuit also changes suddenly in a way which cannot be compensated by the turn-off control device. As a result there is a risk that the current will not be switched from one bridge branch to the other, but be taken with unchanged polarity over more than one half period. This may lead to an increased voltage on the load capacitor which may destroy the inverse rectifier thyristors of the prior art frequency converter comprising a load circuit which has in addition to a load capacitor also a compensating capacitor in the connecting branch between the load inductance and the load capacitor.

On the other hand German Patent Specification 27 22 814 discloses an arrangement for a detector circuit in which measuring transducers each associated with one bridge branch detect whether current is flowing simultaneously or there is zero current simultaneously in both bridge branches outside the interval determined by the turn-off time. As a result the direct current supply of the frequency of the inverse rectifier is switched off in case of interferences with individual thyristors of the bridge circuit. There is the risk that undesirable voltage peaks may destroy the thyristors of the inverse rectifier. The prior art detector circuit also has the following disadvantage: if the currents are not flowing simultaneously in the two bridge branches outside the turn-off time, but nevertheless they are not flowing in the phase position determined by the firing pulses, the prior art detector circuit is incapable of detecting such incorrect switching.

It is therefore an object of the invention so to further develop a frequency converter of the kind specified as to prevent any impermissible increase in voltage at the thyristors due to sudden changes in the impedance in case of any incorrect switching.

This problem is solved according to the invention by a frequency inverter of the kind specified, by the feature that a safety firing circuit controlled by a detector circuit to detect incorrect switching delivers firing pulses without delay to all the thyristors at least until all the thyristors are current-carrying.

The immediate simultaneous constrained firing of all the bridge thyristors if the detector circuit has not detected correct switching results in a flow of current in the inverse rectifier not via the diagonally adjacent bridge branches, but via the thyristors in each of the directly adjacent branches. The method according to the invention results in symmetry of the voltages at the load points on one hand and at the feed points of the bridge circuit on the other, thus effectively preventing overvoltage at the thyristors. The detector circuit ensures that such constrained firing always takes place if the current does not flow in the bridge branches in the manner required by the firing pulses.

The invention will now be explained with reference to a drawing illustrating an embodiment thereof.

A parallel oscillatory circuit frequency converter comprises a rectifier 1 which is supplied by rotary current mains and with which a current and voltage regulator 2 is associated, a smoothing inductor 3 and an inverse rectifier 4. Both the rectifier 1 and the inverse rectifier 4 are thyristorized.

A load circuit 5 constructed as a parallel oscillatory circuit comprises a resistor R, an inductance L, and a series circuit of two capacitors C, $C_K$ connected parallel to the inductance L, whereby the capacitor C is disposed in the connecting branch to the load points of the bridge circuit of the inverse rectifier 4. The parallel oscillatory circuit is so connected to load points of the bridge circuit of the inverse rectifier 4 that the load circuit 5 is supplied with current alternately from the diagonally adjacent bridge branches of the inverse rectifier 4 formed by the thyristors a, $a^1$ and b, $b^1$. The firing pulses supplied to the firing electrodes of the thyristors of the inverse rectifier 4 and initiating switching are adjusted by a turn-off time control device 6. The trapezoidal current flowing into the load circuit 5 is supplied via a current transducer 8 to a discriminator 9 which supplies a control pulse to a gate-control turn-off time measuring device 7 when the current reaches crossover. By means of a further discriminator 10 connected in parallel with the capacitor C of the load circuit 5 the voltage crossover of the sinusoidal voltage is determined, and a control signal is delivered to the turn-off time measuring device 7 at crossover. The turn-off time measuring device 7 also receives a starting signal at the same time as the firing pulse delivered to the thyristors of the two diagonally adjacent bridge branches. The turn-off time determined by the turn-off time measuring device 7 is supplied as an actual time to the turn-off time control device 6, which after comparison with a supplied required value delivers firing pulses with a cycle frequency which is only slightly above the specific frequency of the parallel oscillatory circuit 5. This measuring device disclosed in European Patent 109 522 enables the turn-off time to be determined with high precision and the inverse rectifier to be operated with a reliable minimum turn-off time.

The primary winding of respective transducers 11 and 12 is disposed in each branch of the two diagonally adjacent branches of the bridge circuit 4. The terminals of the secondary windings of the two transducers, which are bridged by rectifier diodes of opposite polarity (not shown), are connected to the inputs of two amplifiers 13, 14 which each carry on their output lines 15, 16 a d.c. signal when the measured value recorders constituted by the elements 11, 13 and 12, 14 detect current flowing via the associated branch of the bridge. The lines 15 and 16 are connected to the two inputs of an exclusive OR gate 17. The gate 17 always generates a pulse on its output line 21 when a current flows simultaneously or the current is zero simultaneously in the two diagonally adjacent branches of the bridge circuit of the inverse rectifier 4. To prevent the gate 17 from responding during switching, while a current flows in the two diagonally adjacent branches of the bridge circuit, during switching d.c. pulses are generated on the lines 19 and 20 from the firing pulses of the thyristors in the particular branches of the bridge circuit via a control apparatus 18, so that when pulses are present on the lines 19 and 20, pulses on the output line 21 are suppressed.

Up to this point the detector circuit is known from German Patent Specification 27 22 814.

Output line 21 is connected via a further logic circuit 22 to the input of a safety firing circuit 24.

The further logic circuit 22 has at its input two exclusive NOR gates. While one of the inputs of the first exclusive NOR gate is connected to the line 15, which delivers a signal when the transducer 11 carries current (thyristor $a^1$) and the other input is connected to the line 20, which is connected to the firing pulse line of the thyristor b, the signals of the line 16 (current signal in thyristor $b^1$) and line 19 (firing pulse signal for thyristor a) are applied to the inputs of the second exclusive NOR gate in the logic circuit 22. The connected gates ensure that a pulse is delivered on the line 23 to operate the safety firing circuit 24 even if the transducers 11, 12 do not simultaneously detect a flow of current—i.e., the detector circuit formed by gate 17 does not respond—but the thyristors $a^1$, and $b^1$ are current in a phase position which does not correspond to the phase position given by the thyristor firing pulse.

If therefore due to sudden changes in load circuit impedance and a consequent increase in specific frequency the polarity of the current is prematurely reversed, before the next switching phase is initiated, a difference is detected between the phase position given by the firing pulses and the actual phase position detected by the current transducers 11; 12. The detector circuit completed by the aforedescribed gate 17 therefore ensures that the safety firing circuit is operated in case of any incorrect switching. The safety firing circuit 24 operates an auxiliary firing pulse generator 25 whose output is connected to all the control signal connections of the thyristors of the bridge 4. If then the detector circuit 11 to 23 detect incorrect switching in the manner described hereinbefore, via its output lines 26a–d the auxilliary firing pulse generator 25 delivers firing pulses simultaneously to all the control lines of the thyristors. This takes place without delay, the result being symmetry in the distribution to the inverse rectifier thyristors of the voltage of the load capacitor C, when charged to an impermissibly high voltage due to incorrect switching. This prevents overvoltage at the thyristors. At the same time, the current peaks occurring as a result of the simultaneous firing of all the thyristors are below the values permissible for their dynamic operation.

Preferably continuous firing pulses are used to bring the thyristors into a stable conductive condition when the safety firing circuit, 24 and the auxiliary firing pulse generator 25 respond. However, it is also possible to switch on the thyristors reliably by operating them with a sequence of firing pulses whose cycle frequency is higher than the cycle frequency of the turn-off time control device by at least a factor of 5.

I claim:

1. A parallel oscillatory circuit frequency converter comprising: a rectifier; an inverse rectifier having two pairs of thyristors arranged in a bridge circuit; a parallel oscillatory circuit including an inductance and a series connection of two capacitors of which one capacitor is connected to load points of the bridge circuit; a turn-off time control device for the alternate firing of the pairs of thyristors in diagonally adjacent branches of the bridge circuit with a cycle frequency adapted to maintain a minimum turn-off time; a detector circuit coupled to the pairs of thyristors to detect incorrect firing thereof; and a safety firing circuit controlled by the detector circuit to deliver firing pulses without delay to all the thyristors at least until all the thyristors are current-carrying.

2. A parallel oscillatory circuit frequency converter according to claim 1, characterized in that the firing pulses are continuous pulses.

3. A parallel oscillatory circuit frequency converter according to claim 1, characterized in that the firing pulses are delivered by a sequence of pulses with a frequency at least five times higher than the cycle frequency.

4. A parallel oscillatory circuit frequency converter according to claim 2, characterized in that the firing pulses are delivered by a sequence of pulses with a frequency at least five times higher than the cycle frequency.

* * * * *